No. 620,249. Patented Feb. 28, 1899.
A. P. PHILLIPS.
MECHANISM FOR SHOCKING GRAIN.
(Application filed Aug. 9, 1898.)
(No Model.) 9 Sheets—Sheet 2.
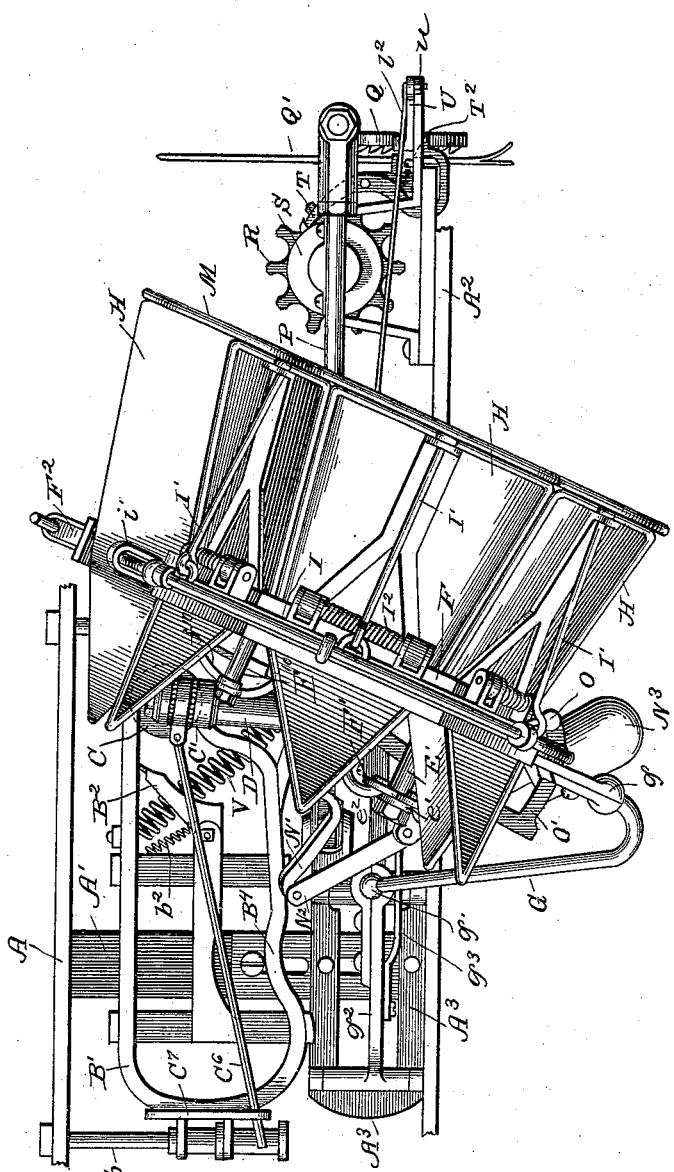
Witnesses
Victor J. Evans.
Alexander Stewart.
Inventor
Anton P. Phillips,
by Church & Church
his Attorneys.

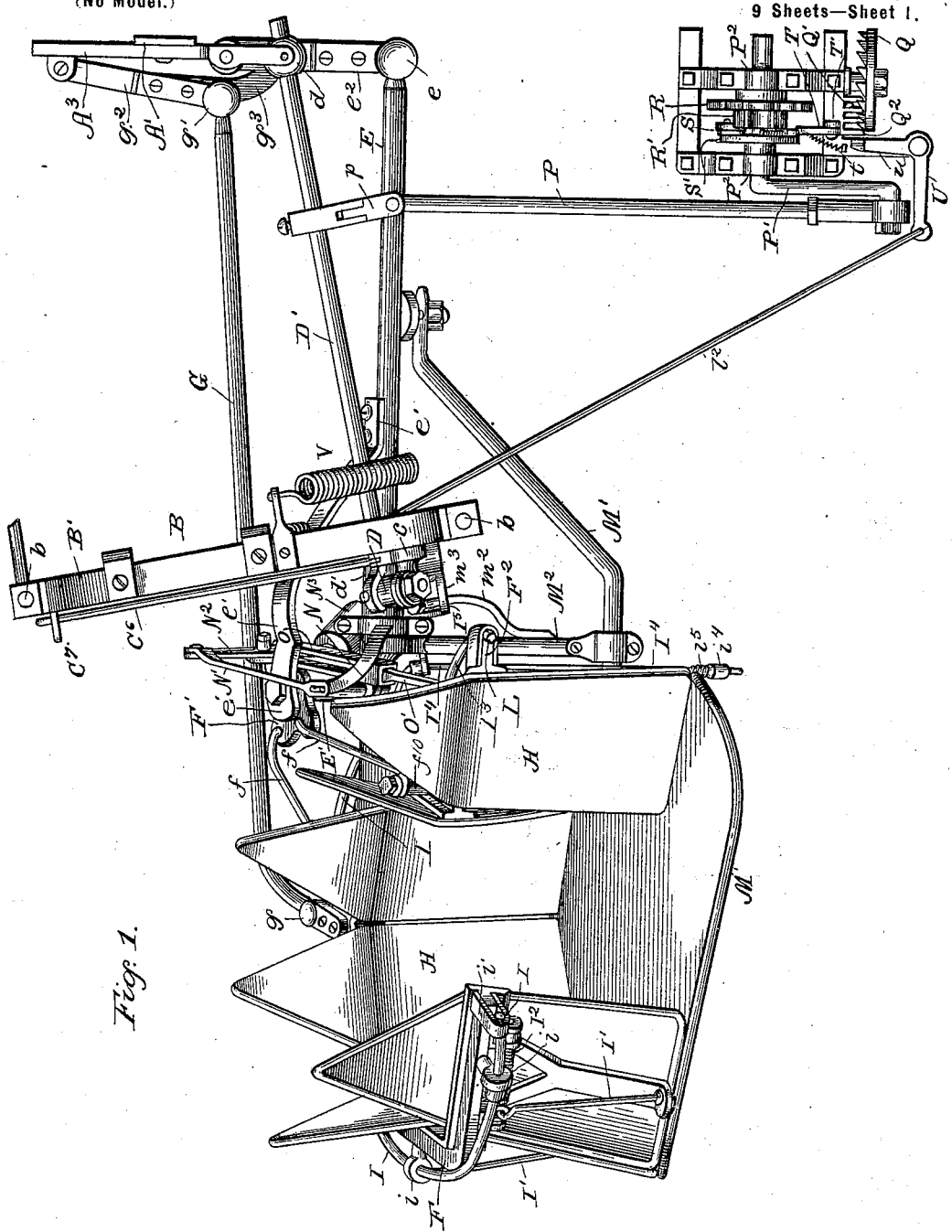

No. 620,249. Patented Feb. 28, 1899.
A. P. PHILLIPS.
MECHANISM FOR SHOCKING GRAIN.
(Application filed Aug. 9, 1898.)
(No Model.) 9 Sheets—Sheet 3.
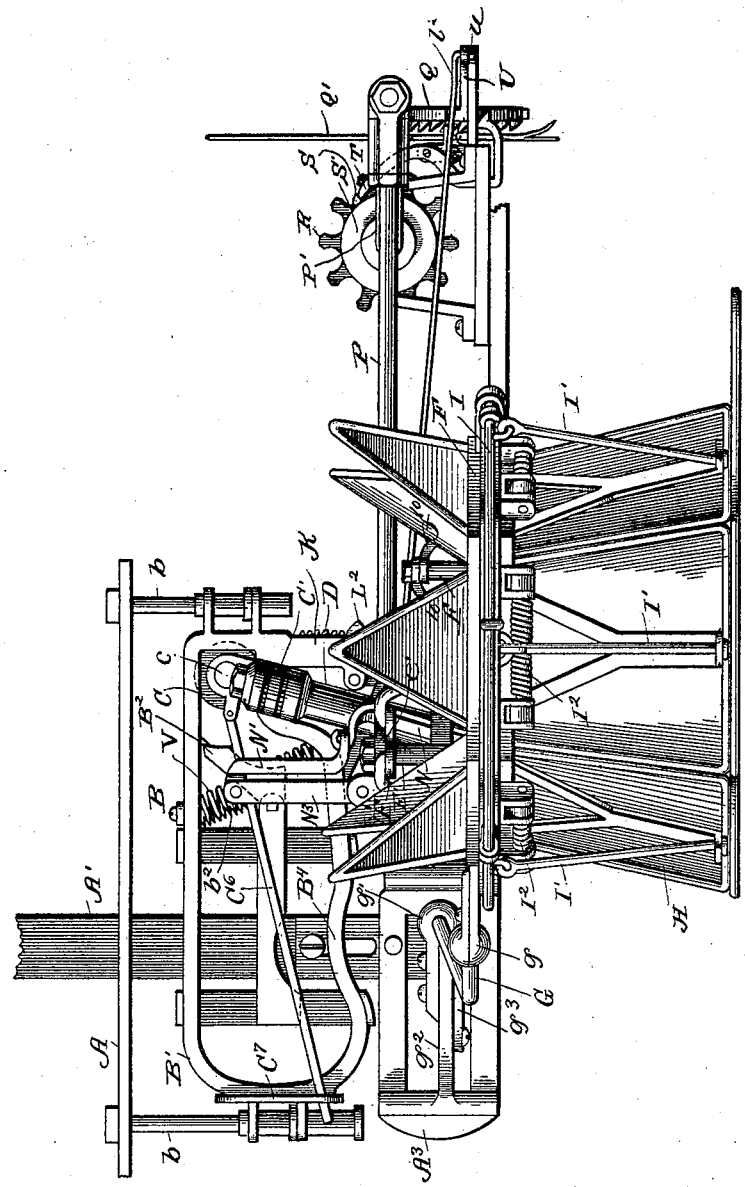
Witnesses
Victor J. Evans.
Alexander Stewart.
Inventor
Anton P. Phillips
by Church & Church
his Attorneys No. 620,249. Patented Feb. 28, 1899.
A. P. PHILLIPS.
MECHANISM FOR SHOCKING GRAIN.
(Application filed Aug. 9, 1898.)
(No Model.) 9 Sheets—Sheet 4.
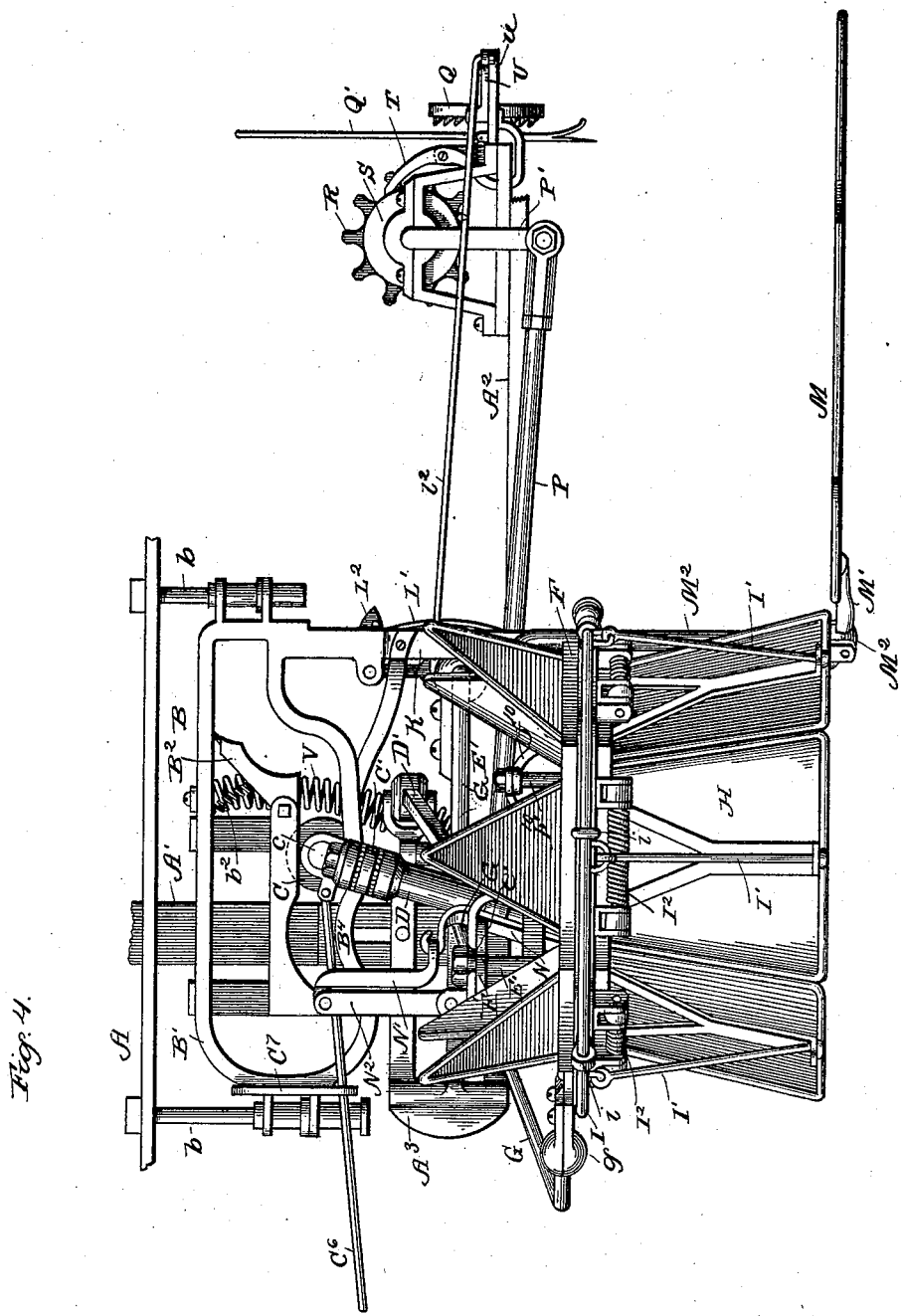

No. 620,249. Patented Feb. 28, 1899.
A. P. PHILLIPS.
MECHANISM FOR SHOCKING GRAIN.
(Application filed Aug. 9, 1898.)
(No Model.) 9 Sheets—Sheet 5.
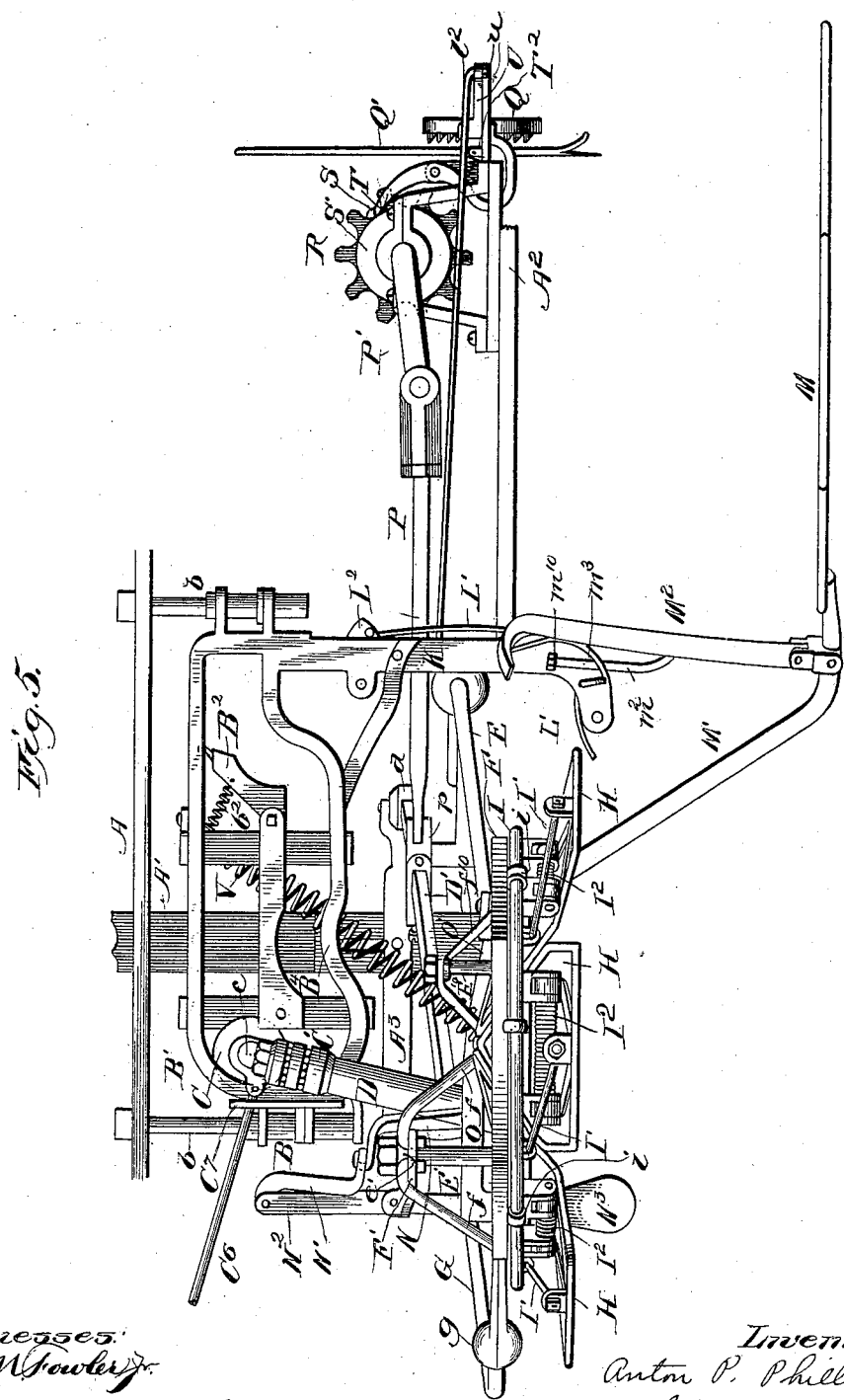
Witnesses:
Inventor
Anton P. Phillips
by Church & Church
his Attorneys

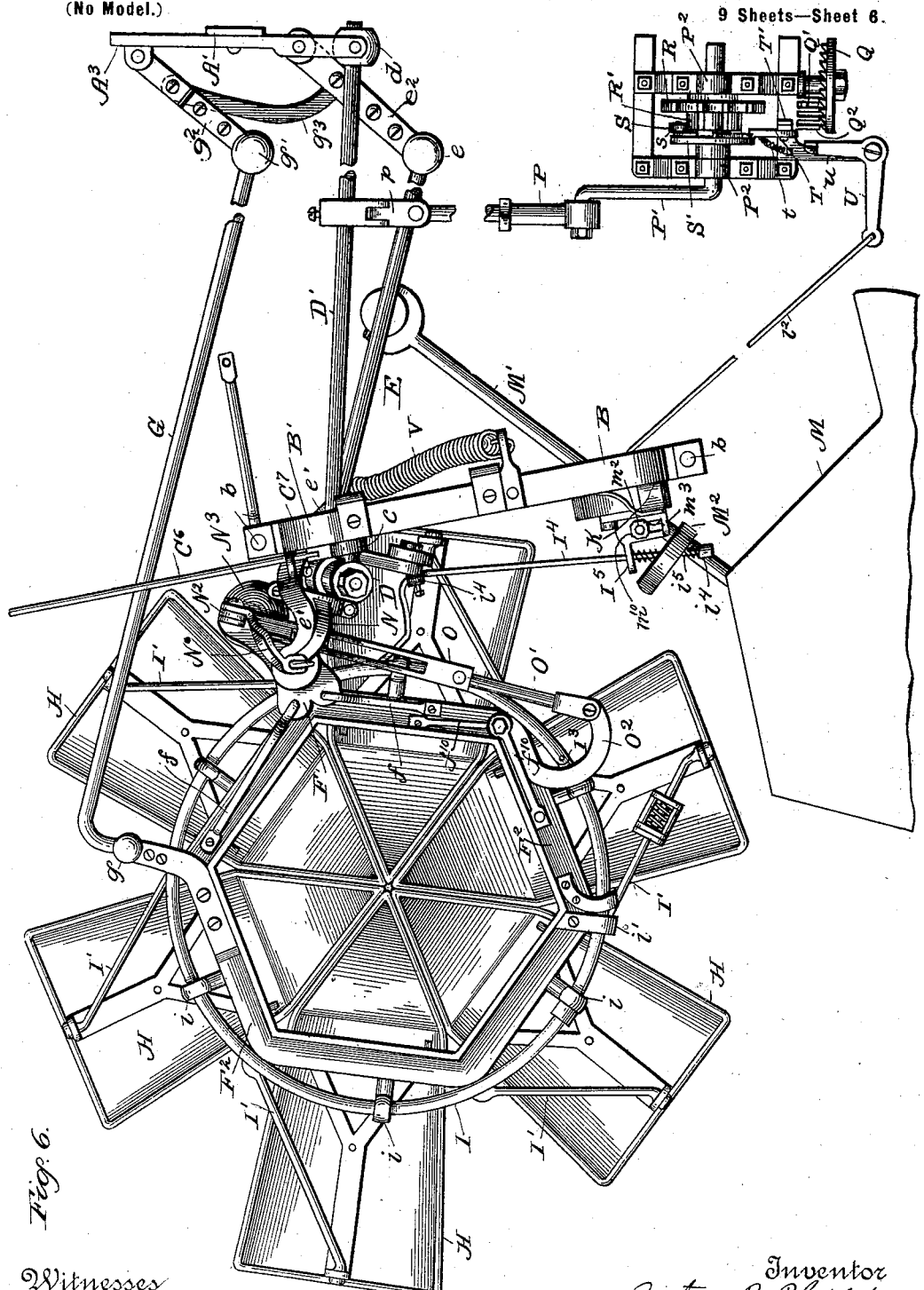

No. 620,249. Patented Feb. 28, 1899.
A. P. PHILLIPS.
MECHANISM FOR SHOCKING GRAIN.
(Application filed Aug. 9, 1898.)
(No Model.) 9 Sheets—Sheet 7.
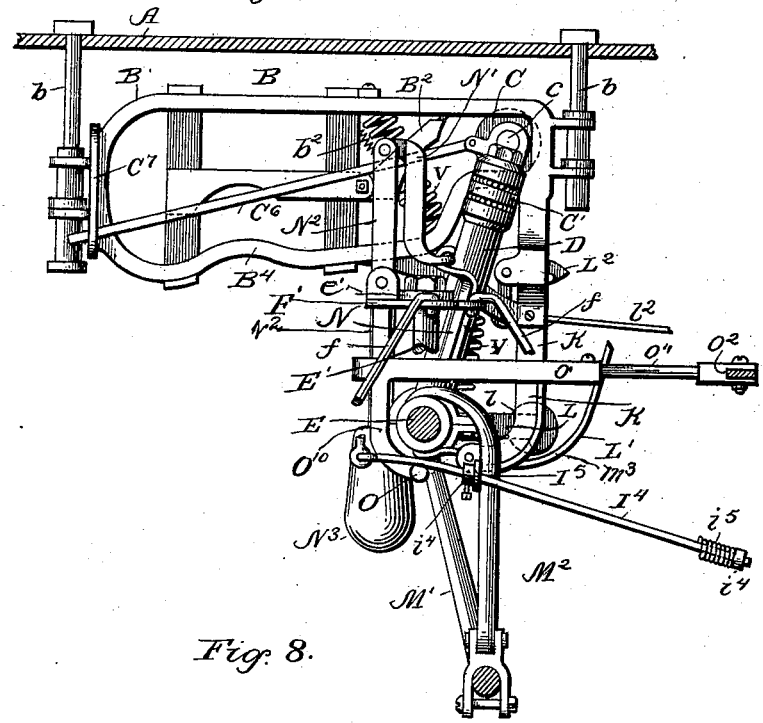
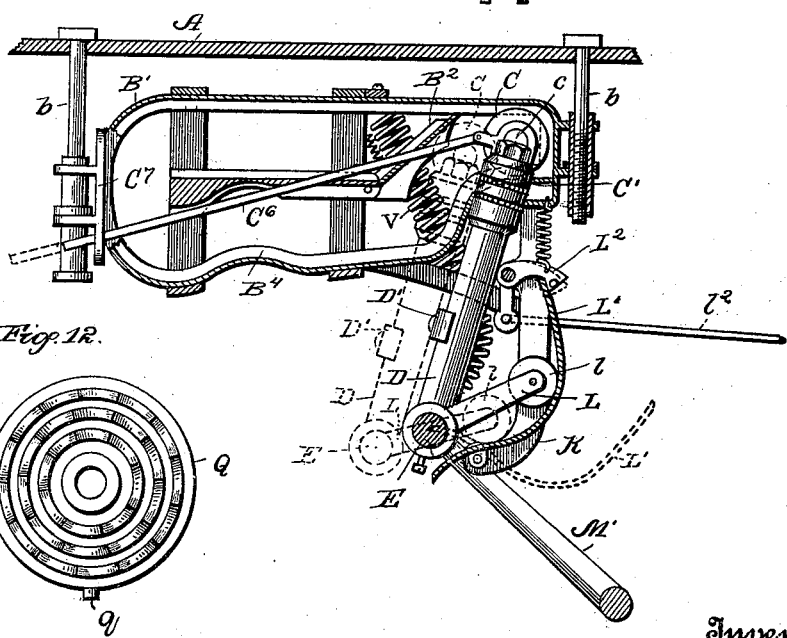
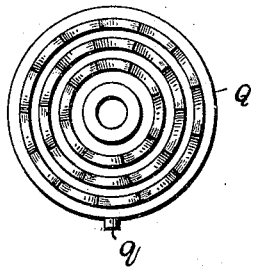
Witnesses
Victor J. Evans.
Alexander Stewart.
Inventor
Anton P. Phillips,
by Church & Church
his Attorneys.

No. 620,249. Patented Feb. 28, 1899.
A. P. PHILLIPS.
MECHANISM FOR SHOCKING GRAIN.
(Application filed Aug. 9, 1898.)

(No Model.) 9 Sheets—Sheet 8.

Witnesses
Victor J. Evans.
Alexander Stewart.

Inventor
Anton P. Phillips
by Church & Church
his Attorneys

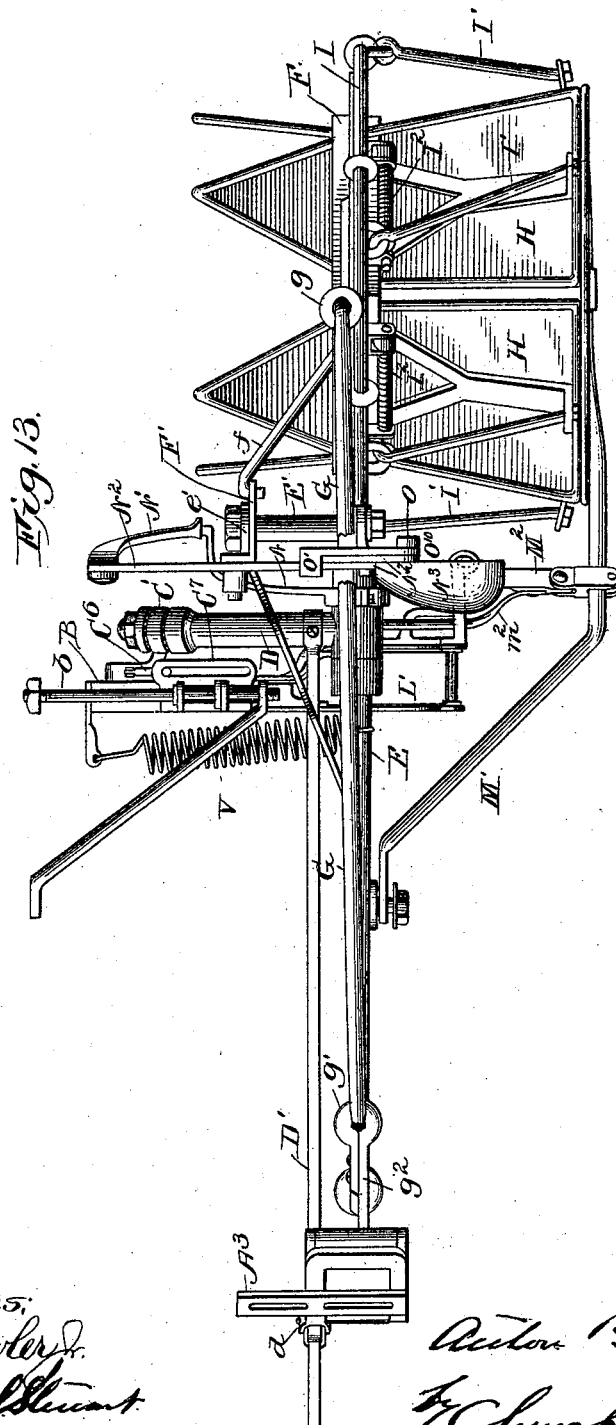

UNITED STATES PATENT OFFICE.

ANTON P. PHILLIPS, OF SIOUX FALLS, SOUTH DAKOTA.

MECHANISM FOR SHOCKING GRAIN.

SPECIFICATION forming part of Letters Patent No. 620,249, dated February 28, 1899.

Application filed August 9, 1898. Serial No. 688,199. (No model.)

*To all whom it may concern:*

Be it known that I, ANTON P. PHILLIPS, a citizen of the United States, residing at Sioux Falls, in the county of Minnehaha and State of South Dakota, have invented certain new and useful Improvements in Mechanism for Shocking Grain; and I do hereby declare the following to be a full, clear, and exact description of the same, reference being had to the accompanying drawings, forming part of this specification, and to the letters of reference marked thereon.

This invention has for its object to provide a mechanism for receiving the grain from a harvester-binder or like apparatus and accumulating the same until a sufficient quantity is gathered to form a shock and then depositing the same upon the ground in a complete and uniform shock, the mechanism then returning to its initial position with respect to the harvester-binder for the reception of the grain to form another shock.

Figure 10:
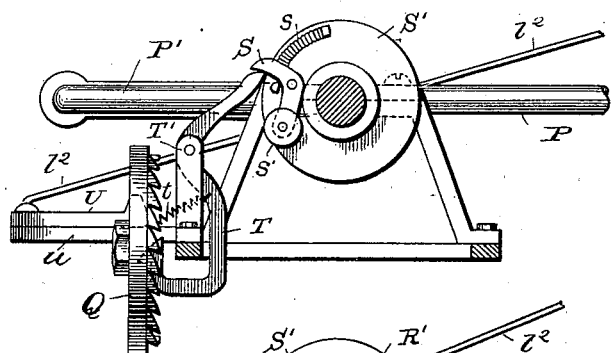
Figure 11:
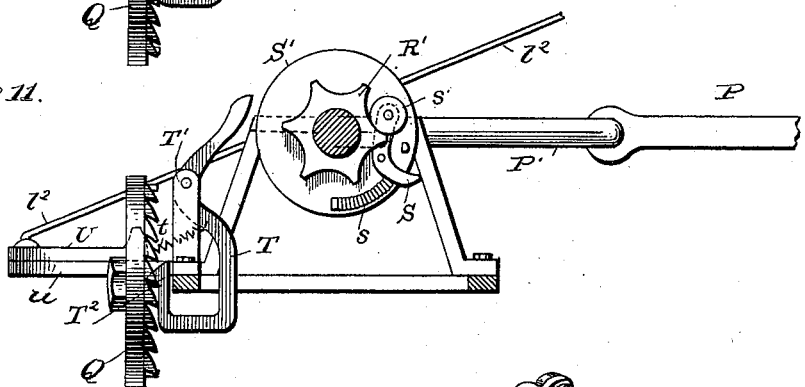
Figure 9:
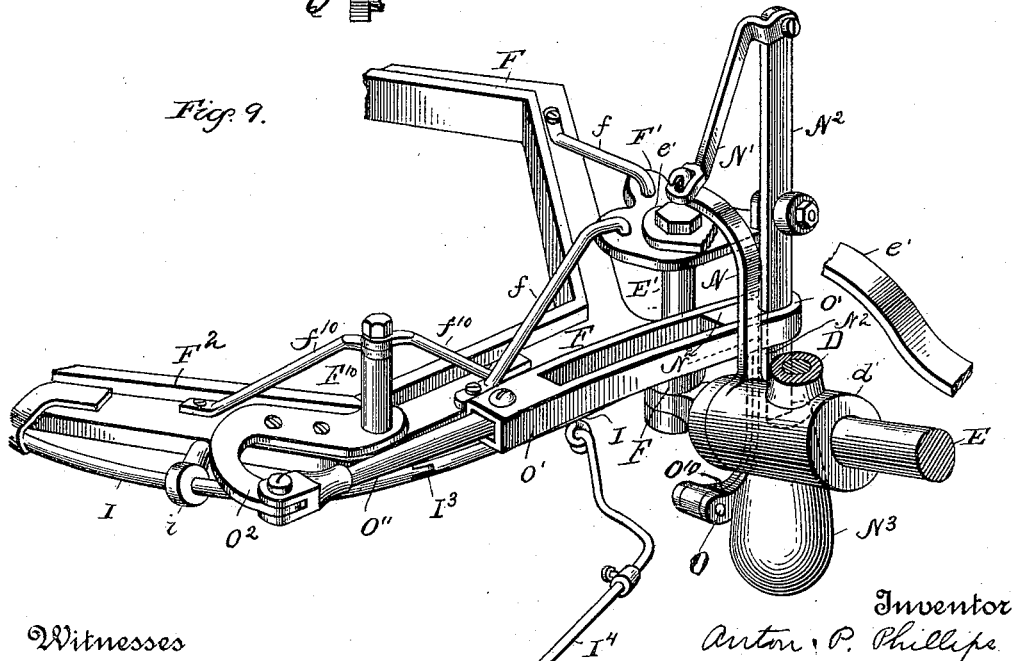

Referring to the accompanying drawings, Figure 1 is a top plan view of the shocking mechanism detached from the harvester-binder and with the parts in position ready to receive the bundle of grain as delivered from the binder. Fig. 2 is an end view of the device with the parts in the same position illustrated in Fig. 1. Fig. 3 is a view corresponding to Fig. 2 with the receiver turned down into horizontal position. Fig. 4 is a corresponding view with the receiver swung part way to the rear and away from the base-plate and bottom of the receiver. Fig. 5 is a view corresponding to Fig. 4 with the receiver opened to press the shock of grain firmly down into shape and to free the receiver itself from the shock deposited by it. Fig. 6 is a top plan view with the parts in the position illustrated in Fig. 5, sections of the connection-rods and of the receiver-bottom being broken away. Fig. 7 is a cross-sectional view showing the mechanism in end elevation with the receiver removed. Fig. 8 is a sectional view with parts shown in elevation which are obscured by the overlying parts in Fig. 7. Fig. 9 is a detail of the mechanism for opening the side doors of the receiver. Figs. 10 and 11 are sectional details of the controlling mechanism for supporting the shocking mechanism and for arresting the movement of the same. Fig. 12 is a face view of the controlling-wheel, showing the different series of teeth for determining the number of bundles to be included in each shock. Fig. 13 is a rear elevation of the apparatus.

In carrying my present invention into practice I have provided a mechanism which is adapted to be carried by a harvester-binder and which will receive the bundles of grain discharged therefrom either directly, where the discharge is of sufficient height, or through the medium of an elevator, where a higher discharge is required, accumulate said bundles until a sufficient number to form a shock has been gathered, turn the bundles so accumulated into vertical position, drop a bundle upon the top of the accumulated bundles, then move the whole body of bundles backwardly at the same rate that the machine is moving forwardly, permitting them to drop as a mass upon the ground, and finally forcing them downwardly and shaping them up into a true and symmetrical shock, the mechanism then returning to its initial position ready to receive bundles again from the binding mechanism. The receiver for the bound bundles of grain in its initial or normal position is preferably inclined somewhat and is open at the top and closed at the bottom, with a section or door in one side also open. When the receiver has been filled or the desired number of bundles have been deposited therein, the side door is closed, the receiver turned down into horizontal position, and then moved toward the rear of the machine or in a direction the reverse of that in which the binder is traveling over the ground, the bottom of the receiver meanwhile remaining stationary, and as a consequence the bundles are swept off of said bottom and allowed to drop out of said receiver upon the ground, at which moment the sides of the receiver are caused to open upwardly and outwardly from the bottom, while the upper ends close inwardly and downwardly, imparting to the mass of bundles a uniform and symmetrical shape and giving them downward pressure from the top and at the same time raising the receiver above the level of the top, leaving it standing in its place in the field, while the mechanism itself or the receiver returns to its initial position ready to receive other bundles from the binder.

Referring to the drawings, the letter A indicates a flat frame arranged horizontally, A' a vertical frame, and A² another horizontal frame at a lower level, said frames being fixed with relation to each other and being preferably fixed and supported by any convenient or preferred portion of the binder-frame itself. The entire shocking mechanism is carried by these three supports, and inasmuch as the reaper and binding mechanism, together with the delivering mechanism for removing the bundles from the binding mechanism and dropping the same into the receiver of the shocking mechanism, form no part of my present invention I have not deemed it necessary to illustrate the same and will not describe the same further herein.

The support A carries a depending frame B, preferably supported for vertical adjustment by screws or other devices $b$, the frame B embodying a track or way B', in which a roller C travels, so as to perform a circuit around the track or way at each operation of the shocking mechanism, the roller starting from the position indicated in Fig. 2 and traveling down the track or way to the position indicated in Fig. 4, and thence traveling up and back along the upper side of the track or way until it passes the spring-actuated gate B², which permits it to pass in one direction in its return movement, but which under the influence of its spring $b^2$ bars its return in the same direction and causes it to travel down and along the under side of the track or way in its outward movement. The roller C is provided with a laterally-extending shaft $c$, carrying a bracket or arm C', in which is journaled a vertically-arranged carrier D, attached rigidly to or forming a part of an inwardly-extending shaft D', which at its inner end is movable longitudinally through a pivoted bearing $d$, mounted in a bracket A³, adjustably fixed to the support A'. The roller C is maintained in its alinement with the track by means of a guide-arm C⁶, attached to the bracket C' and extending along parallel with the track or way, its end being held in a slotted guide C⁷, so as to be capable of a vertical movement therein, but held against movement transversely of the track or way.

The carrier D supports the weight of the shocking mechanism proper, and for this purpose it is provided near the lower end with a journal $d'$, in which a substantially horizontal shaft E is mounted, the said shaft being further supported at its inner end in a universal joint $e$, preferably ball and socket, Fig. 1, formed in the end of a horizontally-movable or pivoted arm $e^2$, journaled in the bracket A³. At its outer end the shaft E carries an upwardly-extending shaft E', an additional support for this shaft being afforded by a diagonal brace or bracket $e'$, extending from the upper end of the shaft E' to the shaft E at an intermediate point, as illustrated clearly in Fig. 1. The shaft E' is adapted to support the receiver of the shocking mechanism, which consists, primarily, of a hexagonal frame F, connected with or journaled on the shaft E' at one side, and a plate F', connected with the frame F by diagonal braces $f$, the plate F' and the frame F being further connected, if so desired, by a sleeve surrounding the shaft E, as shown, in order to afford additional rigidity. The movements of the ring F about the shaft E' as a center of movement are controlled by a connecting-rod G, which is united to the said ring F by a universal joint $g$, the opposite end of the rod G being held by a universal joint $g'$ in the arm $g^2$, corresponding to the arm $e^2$ and connected for simultaneous movement with said arm $e^2$ by a connecting-link $g^3$.

The ring or frame F, which I have shown as hexagonal, may be of any other substantially circular shape, although I prefer that it should have faces, inasmuch as I prefer to form the side walls of the receiver proper of a series of sections H, straight in cross-section transversely and tapering from the bottom to the top. These sections are pivotally supported intermediate their ends on the ring F and when in one position of adjustment form a receptacle having a somewhat larger cross-sectional area at the bottom than at the point of attachment to the ring, while the upper end is flared outwardly to a slight extent, as illustrated in Figs. 2, 3, and 4, each of the sections at the upper end being pointed in order that when in the other position of adjustment the said upper ends of the sections will come together at the center of the ring with a downward movement, and the sections are spread apart at their lower ends, as illustrated in Figs. 5 and 6, in which position the contents of the receiver will be dropped and its top portion pressed down, so as to give it a firm seat on the ground. At one side a section of the ring itself (lettered F²) is hinged to the body of the frame or ring and carries one of the receiver-sections H, which thus constitutes a side door or gate which may be opened or closed in order to facilitate the entrance of the bundles as they are discharged from the binder, as will be presently explained. The pintle F¹⁰, on which the section F² is hinged at the top, is extended upwardly, and diagonal braces $f^{10}$ extend down on each side to prevent sagging of the section F² when swung open.

The sections H are moved from the position indicated in Figs. 3 and 4 to that in Figs. 4 and 5, and vice versa, by means of a supplemental ring or traveler I, journaled in bearings $i$ on the main ring and connected at suitable points with the lower ends of the sections H by means of links I', which when the supplemental ring is moved in one direction around the main frame will cause the sections to swing down into the position shown in Figs. 3 and 4 and when moved in the opposite direction to swing up into the position indicated in Figs. 5 and 6, the latter movement being preferably aided by coiled springs I², interposed between the main ring and each of the sections, at the joint between the two. The supplemental ring I is provided with a hinged section $I^3$, corresponding to the hinged section $F^2$ of the ring F and permitting the gate or door to open when the supplemental ring I is in normal position and locking it against being opened at all other times, inasmuch as in all other positions of adjustment the hinged section of the ring I will pass into one of the bearings $i$, and thereby be prevented from outward movement.

The supplemental ring I is moved by means of a connecting-rod $I^4$, which at its opposite end passes through an opening in a bracket $I^5$, projecting laterally from a downwardly-extending bracket or support K, forming a part of or rigidly connected with the track B'. (See Figs. 5, 6, and 7.) The connecting-rod $I^4$ carries at opposite ends adjustable collars $i^4$ and, if desired, a spring or springs $i^5$, which will strike against the bracket $I^5$ as the receiver moves transversely, and thereby move the supplemental ring in one direction or the other with relation to the main receiver-ring, so as to open or close the receiver-sections.

As before stated, the receiver when in position for receiving the bundles of grain occupies an inclined position, with the side door or gate open, as indicated in Figs. 1 and 2. The mechanism for opening and closing the door or gate will be presently described, and the mechanism for turning the receiver up into its inclined position and permitting the same to drop down into its horizontal position again consists, essentially, of an arm L, rigidly connected by an adjustable connection, such as a set-screw, if so desired, with the shaft E, which arm L carries an antifriction-roller $l$ in its end and is adapted to coöperate with an incline carried by the dependent bracket K, before referred to. The incline preferably employed is lettered L' and is pivoted near its lower end to the bracket K, its upper end being held by a spring-pressed catch $L^2$ and adapted to be released by means of a rod $l^2$, extending to the controlling mechanism, which will be presently described. In operation the roller $l$, striking the incline, is guided by the same as the receiver comes back to the front of the machine, and, being attached rigidly to the shaft E, the shaft is partially rotated, and carries with it the receiver, and the extent of travel of the roller $l$ up the incline determines the angle at which the receiver shall stand. When the catch $L^2$ releases the incline, it will drop down to the position indicated in dotted lines in Fig. 8, allowing the arm L to swing down, together with the receiver, into the position indicated in Fig. 3, or into horizontal position. Then as the receiver moves toward the rear of the machine the roller $l$, traveling off to the end of the incline, will force it up into its normal position, where it will be caught and held by the catch $L^2$, ready to again guide the roller as the receiver returns to its initial position.

The receiver is closed at the bottom by a base-plate M, preferably conforming approximately to the contour of the base of the receiver, which plate M is carried by an arm M', which extends inwardly and upwardly and at its end is connected to the shaft E by a pivotal connection, which will permit the two parts to move transversely with relation to each other, but which will prevent any rotary movement of the shaft E independently of the support M' and plate M, the result being that the shaft E and the receiver M may move transversely away from the plate M, as indicated in Fig. 4; but the rotary movements of the receiver with the shaft E as an axis and which take place when the receiver is moved into or out of its inclined position will be participated in by the plate M and its support M'. As an additional support for the base-plate M when the weight of the grain rests thereon its supporting-arm M' is connected with the shaft E when the shaft E is in its forward position by a hooked hanger $M^2$, which is pivotally connected with the supporting-arm M', so as to be capable of a swinging movement longitudinally of the arm, and is guided by an offset or branch hanger $m^2$, which passes up through a slot in a fixed bracket $m^3$, rigidly attached to or forming part of the depending bracket K. The upper end of this branch hanger $m^2$ is provided with a head or enlargement $m^{10}$, which will contact with the bracket $m^3$ should the plate M drop when not loaded and prevent the same from passing beyond such a position that the hooked upper end of the hanger will pass over the shaft E when the latter returns to its forward or initial position of adjustment. By pivoting the hooked end hanger $M^2$ as described it does not interfere in any way with the swinging movement of the shaft E, as might be the case were it a rigid projection from the supporting-arm M' or plate M.

For the purpose of opening and closing the side door or gate in the receiver an upwardly-extending arm is provided on the carrier D, (lettered N in the accompanying drawings,) which bracket or arm is connected by a link N' with the upper end of a lever $N^2$, pivoted at an intermediate point to the plate F', and at its lower end is connected at O by a pivotal connection with a downwardly-extending arm $O^{10}$ of a link O', which link is slotted for the reception of the lever $N^2$ and extends along the side of the receiver and is connected by a reduced portion $O^{11}$ at its forward end with a bracket $O^2$, rigidly secured to the door or gate. When the receiver is turned up to its inclined position, it occupies a different angle with relation to the carrier D than it does when it is down in its horizontal position, and this relative movement causes the end of the bracket M and the pivotal point of the lever $N^2$ to move toward and from each other, whereby the lever N² is caused to swing on said center, and, its lower end being connected with the door or gate, will open the said gate or door when the receiver is turned up into its inclined position and close the same when the receiver is turned down into its horizontal position. To aid in effecting this result, the lower end of the lever N² may be provided with a weight N³, as will be readily understood.

The carrier is caused to travel around the track or way and the receiver to move back and forth from receiving position to discharging position by means of power applied through the shaft D'. The shaft D' is connected by a connecting-rod P, having a universal joint $p$ therein, with a crank P', journaled in bearings P², held by the support A² and adapted to be rotated intermittingly by a mechanism which will be presently described. This mechanism is adapted to cause the shaft and the crank to make one complete revolution, which will correspond to a complete excursion of the receiver from its receiving position to its discharging position and back again to its receiving position, and it is obvious that it may be driven from any moving part of the binder or machine to which the shocking mechanism is applied and that it may be thrown into operation automatically or by hand, as found most convenient; but in the preferred form I employ a controlling-wheel which will be operated by the binder or gaveling arm and in such manner that after a certain predetermined number of excursions of the binder or gaveling arm the shocking mechanism will be thrown into action, so as to deposit in the form of a shock the bundles accumulated thereby.

In the accompanying drawings the letter Q indicates what I have termed the "control-wheel," and it will be seen from Fig. 12 that it is provided on its face with three series of ratchet-teeth, each of the series having a different number of teeth from each of the other series, the number of teeth in each series determining the number of bundles to be deposited in the receiver before the shocking mechanism is operated. This control-wheel Q is preferably journaled in proximity to the crank-shaft P', and it is adapted to be rotated by a pawl Q', which is carried by the binder or gaveling arm or moved in unison therewith, so as to rotate the control-wheel one tooth at each operation of the binder or gaveling arm. The pawl may be made to engage with any one of the series of teeth, and so will give the control-wheel a complete revolution with a greater or less number of operations, as will be readily understood. The pawl may be guided and held in engagement with the desired set of teeth by a guide Q², arranged in proximity to the control-wheel.

Mounted on the crank-shaft P' there is a constantly-driven wheel R, and interposed between this wheel and the shaft is a clutch mechanism, preferably composed of a star-wheel R' on the wheel R and a pawl S, carried by a disk S', rigidly fixed to the shaft. The pawl S is preferably in the form of a bell-crank lever advanced by a spring $s$, Figs. 10 and 11, and it carries a roller $s'$, which forms the engaging end for coöperation with the star-wheel, the construction being also preferably such that should the driven wheel rotate backwardly the parts will not engage. One arm of the bell-crank lever S projects beyond the periphery of the disk S' and is adapted to be engaged by a throw-out lever T, pivoted on a fixed support T' and adapted to move the pawl out of engagement with the star-wheel and permit the driven wheel to rotate freely. The throw-out lever T is provided with an incline T² at its opposite end lying in position to be engaged and moved by a projection or tooth $q$ on the control-wheel Q once in each revolution of the control-wheel, and when so moved by the tooth $q$ to move out of engagement with the pawl S and allow the same to lock the crank-shaft and driving-wheel together, thereby operating the shocking mechanism. Before the shocking mechanism has completed its excursion the control-wheel will have moved out of engagement with the throw-out lever T, and it will return by gravity or under the influence of a suitable spring $t$ into position to again engage the bell-crank pawl and disengage the driving-wheel and crank-shaft. Thus when the crank has made one complete revolution it will be arrested until the control-wheel again moves out of engagement with the pawl. The control-wheel, in addition to performing the function just described, also controls the catch L², so as to release the incline L' and allow the receiver to swing down into horizontal position. This operation is performed prior to the disengagement of the pawl and through the medium of the connecting-link $l^2$, which extends back and is connected to one end of a bell-crank lever U, pivoted to a fixed support $u$ and having one of its arms projecting into position to be engaged by the tooth $q$ on the control-wheel just prior to the engagement of said tooth with the throw-out lever T.

In operation, then, it will be seen that the control-wheel first releases the catch L² and permits the receiver to swing down into horizontal position, which movement releases the said door or gate. Then it operates the throw-out lever and permits the drive-wheel and shaft to become locked together, and by the rotation of the crank-shaft the receiver is moved backwardly and downwardly to sweep the accumulated bundles of grain off of the base-plate M. During this movement the carrier travels along the track or way and just prior to the moment when the sections of the receiver open out the wheel C travels over a slight rise B⁴ in the track or way, thereby slightly raising the receiver and loosening the bundles of grain therein, the further movement of the carrier and receiver causing the receiver to be depressed slightly as the sections are opened, thereby exerting a further pressure upon the top of the formed shock. The opening of the sections tends to raise the receiver upwardly as it reaches the extreme of its backward movement, and in order to complete this movement or to insure its being performed I preferably provide a relatively heavy spring V, which extends between the upper portion of the track or way or other suitable fixed support about centrally of the path of travel of the carrier down to the shaft E, which spring will be distended when the carrier is moved to the rear extreme of its movement and will then tend to raise the carrier, together with the receiver and parts connected therewith, and insure the return of the wheel C and carrier along the upper portion of the track or way, lifting it over the formed shock of grain.

The bundle discharged by the binder mechanism as the receiver turns down into horizontal position is adapted to form the cap of the shock and to rest transversely on the top of the previously-accumulated bundles, as will be readily understood.

Having thus fully described my invention, what I claim as new, and desire to secure by Letters Patent of the United States of America, is—

1. In a shocking mechanism for reapers, the combination with a receiver for accumulating and forming the grain into a shock, a carrier for the receiver and mechanism for moving the receiver rearwardly and forwardly, of a guide for directing the receiver in a lower plane during its rearward movement than it occupies during its forward movement, and mechanism for elevating the receiver at the rear end of its movement; substantially as described.

2. In a shocking mechanism for reapers, the combination with a rearwardly and forwardly movable receiver adapted to oscillate in its plane of movement whereby it may occupy an inclined or a horizontal position, of a driving mechanism for moving the receiver rearwardly and forwardly and means for turning it into an inclined position when at the forward extreme of its movement; substantially as described.

3. In a shocking mechanism for reapers, the combination with a pivotally-supported receiver movable horizontally from receiving to discharging position, of driving mechanism for moving it horizontally and a tilting mechanism for turning the receiver on its pivotal center into receiving position at the forward extreme of its movement; substantially as described.

4. In a shocking mechanism, the combination with the receiver mounted on a horizontal axis and movable horizontally in a plane substantially at right angles to its axis from receiving to discharging position, of an arm on the receiver and a pivoted incline with which the arm coöperates to turn the receiver on its axis; substantially as described.

5. In a shocking mechanism, the combination with the receiver mounted on a horizontal axis and movable horizontally in a plane substantially at right angles to its axis from receiving to discharging position, of an arm on the receiver, a pivoted incline with which the arm coöperates to turn the receiver on its axis, a catch for holding the incline in operative position and a control-wheel for releasing said catch to permit the receiver to turn into horizontal position; substantially as described.

6. In a shocking mechanism, the combination with the receiver mounted on a horizontal axis and movable horizontally in a plane substantially at right angles from its axis from receiving to discharging position, of means for turning said receiver on its horizontal axis and a track or way guiding said receiver in its horizontal movements, said track being arranged vertically and having its return path at a higher elevation than its rearward path whereby the receiver moves rearwardly at a lower level than its level in returning to the front; substantially as described.

7. In a shocking mechanism, the combination with the receiver, movable horizontally from receiving to discharging position, of a carrier for supporting said receiver and a track or way for guiding said carrier arranged in a vertical plane with a continuous path for the carrier and a cut-off or gate for directing the movement of the carrier into the lower portion of the path during its rearward movement and with means for raising the carrier at the extreme of its rearward movement; substantially as described.

8. In a shocking mechanism, the combination with a receiver movable horizontally from receiving to discharging position and a carrier supporting said receiver, of a track or way in which the carrier is mounted arranged in a vertical plane and having a path which extends downwardly and rearwardly from the normal position of the carrier whereby in its initial movement the carrier will be dropped from a higher to a lower level; substantially as described.

9. In a shocking mechanism, the combination with a receiver, movable horizontally from receiving to discharging position, and a carrier for said receiver, of a track or way for the carrier, said track or way having a rise adjacent to its rearward extremity, whereby the receiver is lifted slightly before discharging, and means for returning the carrier to its initial position at a higher elevation; substantially as described.

10. In a shocking mechanism, the combination with a receiver, a substantially horizontal swinging shaft with which said receiver is pivotally connected on a vertical axis and a controlling-shaft for controlling the swing of the receiver on said vertical axis, of a carrier connected with said horizontal shaft and a track or way in which the carrier travels; substantially as described.

11. In a shocking mechanism, the combination with a vertically-arranged track or way extending in substantially the plane of movement of the machine, a carrier traveling in said track or way, a substantially horizontal shaft journaled in said carrier and a receiver mounted on said substantially horizontal shaft so as to move therewith and be rotated thereby, of a driving mechanism connected with said carrier for moving the receiver horizontally and a tilting mechanism connected with said shaft for rotating the same to tilt or incline the receiver when at the receiving-point; substantially as described.

12. In a shocking mechanism, the combination with a vertically-arranged track or way extending in substantially the plane of movement of the machine, a carrier traveling in said track or way, a substantially horizontal shaft journaled in said carrier at one end and pivotally supported at its opposite end, a receiver mounted on said shaft so as to move therewith and be rotated thereby, of a driving mechanism connected with said carrier for moving the receiver horizontally and a tilting mechanism connected with said shaft for rotating the same to tilt or incline the receiver when at the receiving-point; substantially as described.

13. In a shocking mechanism, the combination with the vertically-arranged track or way extending in substantially the plane of movement of the machine, a carrier traveling in said track or way, a substantially horizontal shaft journaled in said carrier at one end and pivotally supported at its opposite end on a movable support and a receiver mounted on said substantially horizontal shaft so as to move therewith and be rotated thereby, of a second supporting-shaft for the receiver pivotally connected with said receiver at one end and with a support moving in unison with the support for the first-mentioned shaft at the opposite end, a driving mechanism connected with said carrier for moving the receiver horizontally and a tilting mechanism connected with the supporting-shaft for the receiver for rotating the same to tilt or incline the receiver when at the receiving-point; substantially as described.

14. In a shocking mechanism, for reapers, the combination with a rearwardly-movable receiver adapted to receive and form the grain into a shock, and to discharge the formed shock, of a driving mechanism for moving said receiver embodying a crank-shaft, a driven wheel, a clutch interposed between said driven wheel and crank-shaft, a throw-out for said clutch and a control-wheel actuated by the binding mechanism for releasing said throw-out and coupling the driving-wheel and crank-shaft; substantially as described.

15. In a shocking mechanism, the combination with a receiver and shock-former, with mechanism for actuating the same to form the shock and discharge it, of a drive-wheel, a clutch interposed between the drive-wheel and shock-former-actuating mechanism, a controller for throwing said clutch into or out of operation and a controller-actuator operated by the gaveling or binder arm of the reaper; substantially as described.

16. In a shocking mechanism, the combination with the receiver for receiving the grain and forming the shock and discharging the formed shock, of a driving-shaft for actuating said receiver, a driving-wheel, a clutch interposed between the wheel and shaft and rotating in unison with the shaft, a throw-out for releasing said clutch at a predetermined point in the rotation of the shaft and a control-wheel actuated from the gaveling or binder arm for operating said throw-out; substantially as described.

17. In a shocking mechanism, the combination with the receiver adapted to receive the grain, form, and discharge the shock, and a tilting mechanism for inclining said receiver when at the receiving-point, of an actuating mechanism embodying a drive-wheel, a shaft, a clutch interposed between the drive-wheel and shaft, a throw-out for said clutch, a control-wheel actuated by the binder or gaveling arm and a tilting-mechanism controller lying in proximity to said control-wheel and adapted to be actuated thereby, whereby the receiver is first released from the tilting mechanism and the operating mechanism thrown into action; substantially as described.

18. A control-wheel for shocking mechanism of reapers having a single controlling projection or tooth and a series of sets of teeth for determining the number of bundles to be deposited in the shocking mechanism before the same is actuated to form and discharge the shock; substantially as described.

19. A receiver for shocking mechanism of reapers having a circular side wall formed of a series of sections pivotally supported on axes to swing upwardly in planes radiating from a common center whereby they may be swung upwardly on diverging lines to release the shock; substantially as described.

20. A receiver for shocking mechanism for reapers having a ring or frame and a substantially circular side wall formed of a series of sections pivotally supported on said ring or frame to swing upwardly in planes radiating from a common center; substantially as described.

21. A receiver for shocking mechanism for reapers having a central ring or frame and a series of side sections pivotally supported on said ring or frame intermediate their vertical length to swing in planes radiating from a common center whereby they may be swung into substantially a horizontal plane with their upper ends substantially closing the space within the central ring or frame; substantially as described.

22. In a shocking mechanism for reapers the combination with a receiver having its side wall formed by a series of hinged sections adapted to swing in planes radiating from a common center, of a carrier for said receiver, an operating mechanism for said carrier and an actuated mechanism for the sections of the receiver thrown into operation by the movement of the carrier; substantially as described.

23. In a shocking mechanism for reapers, the combination with a receiver having a central ring or frame, a series of sections pivotally connected with said central ring or frame intermediate their length to swing in planes radiating from a common center and a carrier for supporting said receiver, of a receiver-section-operating mechanism for swinging said sections on their pivotal centers whereby the lower end of said sections will be moved outwardly and the upper end of said sections will press downwardly upon the material contained within the receiver; substantially as described.

24. In a shocking mechanism for reapers, the combination with a track or way having a rearward path and a return path, the rearward path being at a lower elevation than the return path, a carrier traveling in said track or way and a driving mechanism for moving said carrier, of a receiver having a series of sections pivotally supported to swing in planes radiating from a common center with means for swinging said sections on their centers as the carrier reaches the rearward extreme of its movement, whereby the pressure of the upper ends of the sections on the material within the receiver will tend to raise the receiver into the return path of the track or way; substantially as described.

25. In a shocking mechanism for reapers the combination with the receiver, a support for said receiver with means for moving the receiver rearwardly to discharge the accumulated grain and means for inclining the receiver when in its receiving position, of a door or gate section forming one side of the receiver and mechanism for opening said door or gate section when the receiver is in its inclined position; substantially as described.

26. In a shocking mechanism for reapers the combination with a non-swinging support and a receiver carrying and actuating mechanism, of a receiver mounted on a horizontal center to swing into inclined or horizontal position, a hinged door or gate section forming one side of said receiver and an actuating mechanism for said door or gate section interposed between the non-swinging support for the receiver and the door or gate section whereby when the receiver is swung into its inclined position, the door or gate section will be opened and when swung into its horizontal position, the door or gate section will be closed; substantially as described.

27. In a shocking mechanism, for reapers, the combination with a carrier for the receiving and shocking mechanism, a shaft journaled in said carrier and a receiver carried by said shaft and having a hinged gate or door section, of a lever, a link interposed between one end of said lever and the carrier and a link interposed between the opposite end of said lever and the door or gate section, with means for rotating said receiver independently of the carrier; substantially as described.

28. In a shocking mechanism for reapers, the combination with a horizontally-movable receiver having a series of pivotal sections constituting its side wall, of an actuating-rod for swinging said sections on their centers, stops on said rod and a fixed bracket with which said stops coöperate to move the sections as the receiver reaches the opposite extreme of its movement; substantially as described.

29. In a shocking mechanism for reapers, the combination with a receiver, movable horizontally from receiving to discharging position with means for moving the same, a series of sections forming the side wall for said receiver mounted on independent axes to swing in planes radiating from a common center and an actuating-ring for said sections, of links connecting the said ring and sections and an operating-rod connected with said ring with stops on said rod and a fixed bracket with which the said stops engage to move the ring and open and close the sections; substantially as described.

30. In a shocking mechanism, for reapers, the combination with a horizontally-movable carrier, a receiver supported by said carrier and adapted to be rotated into an inclined or into a horizontal position, of a base-plate for closing the bottom of said receiver and connections between said base-plate and the receiver-carrier whereby when the receiver is rotated, the base-plate will be rotated in unison therewith and with means for holding the base-plate against horizontal movement; substantially as described.

31. In a shocking mechanism for reapers, the combination with a receiver with means for moving said receiver horizontally from receiving to discharging position, of a bottom or base plate for closing the bottom of the receiver and a hook or support for connecting said bottom or base plate and receiver when in receiving position; substantially as described.

ANTON P. PHILLIPS.

Witnesses:
H. H. KEITH,
R. H. WARREN.